July 29, 1969     M. D. COOPER     3,457,959

TEST PLUG

Filed Dec. 16, 1966

INVENTOR.

M. D. COOPER

BY Robert Neel Roley

ATTORNEY.

United States Patent Office 3,457,959
Patented July 29, 1969

3,457,959
TEST PLUG
M. D. Cooper, 1209 G St., Alexandria, Va. 22307
Filed Dec. 16, 1966, Ser. No. 602,322
Int. Cl. F16l *55/10;* E03d *11/10, 9/04*
U.S. Cl. 138—90
3 Claims

ABSTRACT OF THE DISCLOSURE

A test plug for conduits is provided which may be inserted through a lateral opening in a conduit such as a T fitting.

This invention relates to improvements in test plugs for conduits and more particularly to an improved test plug that may be inserted through a lateral opening in a conduit such as the non-axial opening provided by a T-type fitting.

It is well known in the prior art to use expansible type test plugs for pressure testing conduits to determine if the installation will withstand the operating pressures necessary for proper functioning. Many of the prior art test plugs are of the type having a resilient plug that is expanded into sealing engagement with the inner wall of the conduit to be tested to compartmentalize the conduit. After the test plug is in place, a pressurized fluid is injected into the conduit up to a predetermined pressure to determine if the installation will withstand operating conditions.

In the building of a house, for example, it will be apparent that it is far better to test water, gas or sewer lines prior to the completion of the house than to await failure of the conduit under operating conditions. For this and other reasons, the testing of fluid carrying conduits has become customary in the environment mentioned as well as many others. It should be understood that the device of the instant invention has utility wherever it is deemed necessary to pressure test a conduit and is not limited to examples hereinbefore or hereinafter discussed.

It is also known in the prior art to provide test plugs of the type that may be inserted through a lateral conduit opening. One of the difficulties of prior art plugs of this type is that unduly complicated operating mechanisms have been provided to expand the plug into sealing engagement with the conduit wall thereby resulting in large, unwieldly devices that have not found acceptance in commercial use.

Another disadvantage of the prior art test plugs which are laterally insertable into a conduit is that they have generally been screw actuated thereby failing to insure that the test plug has been expanded an amount sufficient to seal off the conduit and yet preclude over-expansion of the plug to the detriment of the sealing mechanism.

It is accordingly an objects of this invention to provide a test plug which is laterally insertable into a conduit for testing conduits in which the operating mechanism of the test plug embodies a simple and expeditious means of expanding the sealing body into contact with the interior conduit wall.

Another object of the instant invention is to provide a laterally insertable plug for sealing off a portion of a conduit in which at least one camming member is used to expand the sealing body into contact with the conduit wall.

Still another object of the invention is to provide a laterally insertable test plug having an operating mechanism which insures optimum expansion of the sealing part of the test plug.

A further object of the invention is to provide a test plug of the type which may be inserted into a lateral opening of a conduit to seal off a portion of the conduit and which provides an inlet to inject a pressurized fluid through the sealing member in order to pressurize the sealed off portion of the conduit.

A still further object of the instant invention is to provide a test plug of the type herein described in which the inlet conduit thereof is comprised of a plurality of disassembleable segments to minimize the size of the test plug during the procedure of inserting the test plug into a conduit.

Other objects and important features of the invention will be apparent from a study of the specification following, taken with the drawing which together show, describe, disclose and illustrate the preferred embodiment or modification of the invention and what is now considered to be the best mode of practicing the principles thereof. Other embodiments or modifications may be suggested to those having the benefit of the teachings herein and such other embodiments or modifications are intended to be reserved especially as they fall within the scope and spirit of the subjoined claims.

Figure 1:
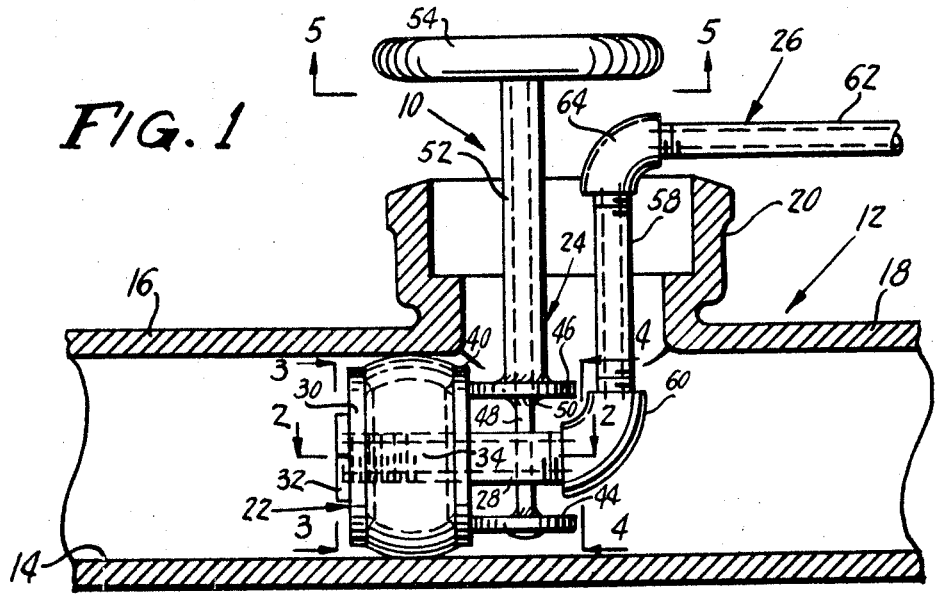
FIGURE 1 is a side elevational view of a test plug made in accordance with the principles of the instant invention and illustrated in the operative position inside a conduit having a lateral opening therein, the conduit being illustrated in longitudinal sectional view for purposes of illustration.
Figure 3:
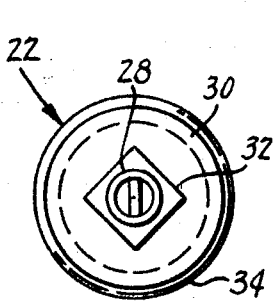
FIGURE 3 is a partial end elevational view of the sealing member of the test plug of FIGURE 1 as may be seen along line 3—3 thereof as viewed in the direction indicated by the arrows.
Figure 2:
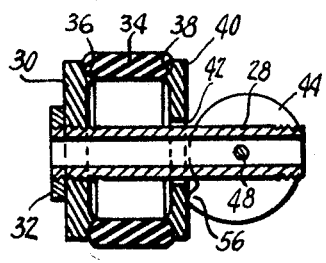
FIGURE 2 is a horizontal cross-sectional view of the test plug of FIGURE 1 taken substantially along line 2—2 thereof as viewed in the direction indicated by the arrows.
Figure 4:
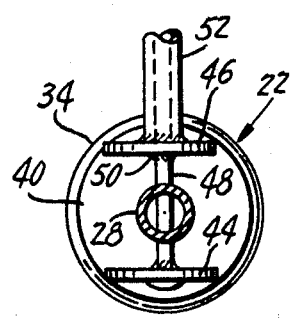
FIGURE 4 is a vertical cross-sectional view of the test plug of FIGURE 1 taken substantially along line 4—4 thereof as viewed in the direction indicated by the arrows.
Figure 6:
Figure 5:
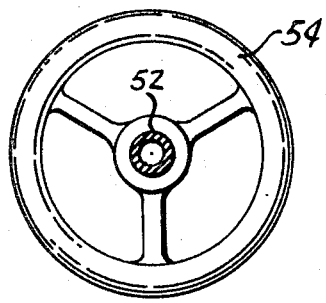

FIGURE 5 is a horizontal cross-sectional view of the test plug of FIGURE 1 taken substantially along line 5—5 thereof as viewed in the direction indicated by the arrows; and FIGURE 6 is a schematic view of a cam operator for the test plug of the instant invention, illustrating the relationship between the cam member and the sealing body when the sealing body is in the relaxed or unexpanded position.

Attention is now directed to FIG. 1 of the drawing wherein there is shown a test plug 10 illustrated as operatively positioned in a conduit 12 of the type having an interior wall 14 and axial passageway forming portions 16, 18 interrupted by a lateral opening 20. While the conduit 12 is illustrated as a unitary tubular body, it will be apparent that the cross-sectional configuration thereof may be varied and that the lateral opening 20 therein may be formed by a conventional T-type fitting.

The test plug 10 has as the major components thereof a sealing body 22 and an operating mechanism 24 with the test plug 10 being preferably provided with an inlet conduit 26 for injecting a pressurized fluid through the sealing body 22 to test the sealed off portion of the conduit 12.

The sealing body 22 comprises a mounting rod 28, which in the illustrated embodiment also forms a leg of the inlet conduit 26 as will be more full explained hereinafter, and a first stationary or fixed plate 30 having an external boss 32 thereon configured to be received by a conventional wrench. The first plate 30 and the boss 32 are internally threaded to be received on a threaded end portion of the rod 28 to preclude movement of the first plate 30 along the rod 28. It will be readily apparent that the fixed relationship between the plate 30 and the rod 28 may be effected in various ways, e.g., as by welding the plate 30 to the rod 28 or by sandwiching the plate 30 between a pair of interiorly threaded nuts.

The sealing body 22 comprises a resilient annular sleeve 34 made of rubber or any other suitable material received at one end portion thereof in a circular groove 36 formed in the first plate 30 and at the other end portion in a circular groove 38 formed in a second plate 40 axially movably mounted on the rod 28. The second plate 40 has a central opening 42 somewhat larger than the external dimension of the rod 28 to allow relatively free movement of the second plate 40 axially along the rod 28.

The external dimension of the sealing body 22 transverse to the axis thereof is normally smaller than the internal dimension of the conduit 12 to allow ready insertion of the sealing body 22 into the position shown in FIG. 1. As will be explained more fully hereinafter, the manipulation of the operating mechanism 24 will tend to axially compress the sealing body 22 thereby increasing the external or radial dimension of the sealing body 22 to seal off a portion of the conduit 12.

The operating mechanism 24 comprises at least one cam member 44 operatively associated with the second or movable plate 40 to advance the plate 40 and compress the sleeve 34 into engagement with the interior conduit wall 14 upon manipulation of the cam member 44 by the remainder of the operating mechanism 24.

The operating mechanism 24 preferably comprises a second cam member 46 diametrically opposed to the cam member 44 to insure uniform advancement of the movable or second plate 40 upon actuation of the operating mechanism 24.

The cam member 44 is illustrated as affixed to a stub shaft 48 extending through and journaled for movement by the rod 28. Suitable sealing means (not shown) may be provided between the shaft 48 and the rod 28 to preclude leakage of fluid around the shaft 48 during the pressurizing operation, as more fully discussed hereinafter. The cam member 46 is likewise affixed to the shaft 48 for rotation therewith in any suitable manner, as, for example, by weld 50. The upper surface of the cam member 46 is secured to an operating shaft 52 extending through the lateral opening 20 in the conduit 12 as shown in FIG. 1. Although it should be understood that the lateral opening 20 may vary from installation to installation, the stub shaft 48 and the operating shaft 52 extend beyond the top of the lateral opening 20 with the length thereof measured from the longitudinal axis of the rod 28 being expressed as about or in excess of one and one half times the dimension of the sealing body 22.

It will accordingly be seen that the cam members 44, 46 are mounted for movement about an axis which is disposed substantially transverse to the longitudinal axis of the sealing body 22 with the longitudinal axis of the operating shaft 52 being disposed generally parallel thereto for allowing the insertion of the test plug 10 through the lateral opening 20 into the operating position as shown in FIG. 1. A suitable handle 54, in the form of a wheel, is operatively connected with the operating shaft 52 to provide a mechanical advantage in the rotation of the operating shaft 52.

Inasmuch as the cam members 44, 46 are substantially identical, a detailed description of only the member 44 will suffice and, as shown best in FIG. 6, the cam member 44 is illustrated as having a rounded protuberance 56 disposed out of engagement with the second or movable plate 40 when the sealing body 22 is in the relaxed or unexpanded position. By the rotation of the handle 54 and consequently the operating shaft 52, the protuberance 56 will be advanced into engagement with the movable or second plate 40 to propel the plate 40 toward the first or fixed plate 30 thereby shortening the length of the sleeve 34 and expanding it into sealing contact with the conduit 12. In a similar manner, reverse rotation of the handle 54 will act to move the protuberance 56 out of engagement with the movable or second plate 40 to relax the sleeve 34 when it is desired to remove the test plug 10 from the conduit 12, as at the end of a testing program.

The inlet conduit 26 comprises a first leg 58 extending generally in the same direction as the operating shaft 52, a second leg which is defined by a part of the mounting rod 28 to the sealing body 22 and a suitable angled connection between the legs 58, 28 which is illustrated as an elbow 60. It should be apparent that the legs 28, 58 and the elbow 60 may be made of an integral pipe segment, as by bending, to form the necessary angle, although certain advantages are lost by so doing as will be more fully pointed out hereinafter.

As shown in FIG. 1, the first leg 58 preferably resides close to the operating shaft 52 to reduce the overall dimensions of the test plug 10 to give the test plug 10 the capability of being inserted into a lateral opening of minimum size. Because of a particular desirable configuration, a third leg 62 and an additional elbow 64 may be needed to avoid interference between the inlet conduit 26 and the handle 54.

Of course the inlet conduit 26 may also comprise suitable valving to control the influx of pressurized fluid through the sealing body 22 and any additional devices necessary or desirable in conducting pressure testing, e.g., pressure gauges or the like, may be employed. It will also be apparent that the third leg 62 is adapted to be connected to a source of pressurized fluid, e.g., a water pump, air compressor or the like, not illustrated.

Although it is believed that the mode of operation of the test plug 10 will be readily apparent from the foregoing discussion, a summary thereof is in order. The sealing body 22 is inserted through the lateral opening 20 of the conduit 12 with the sleeve 34 being in the relaxed position to facilitate ease of handling. The inlet conduit 26 may be assembled prior to the insertion of the sealing body 22 into the conduit 12 if the lateral opening 20 is sufficiently large to accommodate the leg 58. On the other hand, if the lateral opening 20 is not large enough to accommodate the leg 58, the leg 58 may be unscrewed from the elbow 60 or the elbow 60 may be unscrewed from the hollow rod 28 to decrease the dimensions of the test plug 10 for the purposes of installation.

It should be pointed out that if the inlet conduit 26 is disassembled during installation of the sealing body 22, the operating shaft 52 and the handle 54 will be intact to provide a convenient means for an operator to use in the insertion condition. If the conduit 26 is disassembled when the sealing body 22 is inserted into the conduit 12, the assembly thereof is required prior to taking further steps in the pressurizing operation.

After the sealing body 22 is in the position shown in FIG. 1, the handle 54 is rotated to advance the protuberance 56 into engagement with the movable plate 40 to force the sleeve 34 into sealing engagement with the interior wall 14 of the conduit 12. After the seal is effected, pressurized fluid is injected through the conduit 26 to fill the isolated portion of the conduit 12 for conducting the test. After the conduit 12 has withstood the predetermined pressure for the period of the test, the test plug 10 is removed from the conduit 12 by reversing the steps of the insertion procedure.

While the invention has been described, disclosed, illustrated and shown in terms of the present or modification thereof as it has assumed in practice, the scope of the invention should not be deemed to be limited by the precise embodiment or modification as herein shown, described, illustrated and disclosed, such other embodiments or modifications being intended to be reserved especially as they fall within the scope of the claims herein appended.

I claim as my invention:

1. A plug for insertion into a conduit through a lateral opening therein, said plug comprising:

a seal body having a normal dimension taken transverse to the longitudinal axis of the body which is smaller than the conduit, said body being expansible outwardly into sealing contact with the conduit upon the imposition of an axial force tending to compress the body;

a fluid inlet for injecting a fluid through the body comprising:
 a leg extending through the sealing body for delivering fluid therethrough; and
 another leg generally perpendicular to and in fluid communication with the first mentioned leg for extending out of the lateral opening of the conduit; and operating means carried by the body for selectively compressing the body into engagement with the conduit, said operating means having:
 a pair of cams mounted on opposite sides of the first mentioned leg for rotation about an axis extending generally transverse relative to the longitudinal axis of the body to compress the body into sealing contact with the conduit;
 means connecting the cams for concurrent rotation;
 an operating shaft operatively connected to one of the cams for rotating the cams in response to rotation of the shaft, said shaft extending generally parallel to the another leg of the fluid inlet for positioning outside the lateral opening of the conduit and having an axis of rotation disposed generally parallel to the axis of rotation of the cam; and means on the shaft for providing a mechanical advantage for rotating the shaft.

2. The test plug of claim 1 wherein the means connecting the cams comprises:
 a stub shaft extending through the first mentioned leg of the fluid inlet;
 one of the cams being affixed to the stub shaft on one side of the first mentioned leg and the other of the cams being affixed to the stub shaft on the other side of the first mentioned leg;
 the stub shaft being rigid with the shaft for rotation therewith.

3. The test plug of claim 1 wherein the fluid inlet further comprises another leg positioned outside of the lateral opening of the conduit in fluid communication with the another leg at substantially right angles thereto; and the means providing the mechanical advantage comprises a wheel generally perpendicularly affixed to the shaft above the another leg.

References Cited

UNITED STATES PATENTS

| | | | |
|---|---|---|---|
| 413,737 | 10/1889 | Shelton | 138—90 XR |
| 910,966 | 1/1909 | Simon | 138—90 XR |
| 1,177,338 | 3/1916 | Kayfetz | 138—90 XR |
| 1,297,113 | 3/1919 | Domenico | 138—90 XR |
| 2,607,370 | 8/1952 | Anderson | 138—90 |
| 3,216,456 | 11/1965 | La Voie | 138—90 |

LAVERNE D. GEIGER, Primary Examiner

HENRY K. ARTIS, Assistant Examiner

U.S. Cl. X.R.

4—94